United States Patent [19]

Sherman et al.

[11] 3,742,150

[45] June 26, 1973

[54] INDUCTIVELY COUPLED DATA COMMUNICATION APPARATUS

[75] Inventors: Leigh E. Sherman; Walter P. Adams; Lynn D. Crawford, all of San Jose, Calif.

[73] Assignee: Mobility Systems, Inc., Santa Clara, Calif.

[22] Filed: Apr. 28, 1971

[21] Appl. No.: 138,194

[52] U.S. Cl. .................................... 179/82, 340/26

[51] Int. Cl. ............................................ H04b 5/00

[58] Field of Search ........................... 179/82, 1 VE; 340/51, 149 A, 195, 174.1 A, 26; 164/88; 246/63 C, 2 E

[56] References Cited

UNITED STATES PATENTS

| | | | |
|---|---|---|---|
| 3,576,524 | 4/1971 | Ogiluy | 246/63 C |
| 3,018,368 | 1/1962 | Mountjoy | 179/82 |
| 3,543,007 | 11/1970 | Brinker | 246/2 E |
| 3,588,372 | 6/1971 | Jauquet | 179/82 |
| 3,474,429 | 10/1969 | McCowen | 340/174.1 A |
| 3,090,944 | 5/1963 | Keilsohn | 340/174.1 A |

*Primary Examiner*—Kathleen H. Claffy
*Assistant Examiner*—David L. Stewart
*Attorney*—Lowhurst & Hamrick

[57] ABSTRACT

Data communication apparatus utilizing a current source, a first set of closely adjacent transmitting coils energized by that current source for developing a first series of magnetic fields and second set of closely adjacent transmitting coils energized by that current source for developing a second series of magnetic fields which have a particular relationship to the first series of magnetic fields, commensurate with the data to be communicated. Carried by a vehicle passing over the transmitting coils is a magnetic field sensing means for each set of coils each of which develops an output signal for comparison with one another when the sensing means is at a preselected position with respect to each transmitting coil.

15 Claims, 7 Drawing Figures

INVENTORS
LEIGH E. SHERMAN
WALTER P. ADAMS
LYNN D. CRAWFORD
BY
Lowhurst & Hamrick
ATTORNEYS

INVENTORS
LEIGH E. SHERMAN
WALTER P. ADAMS
BY LYNN D. CRAWFORD

Lowhurst & Hamrick
ATTORNEYS

INDUCTIVELY COUPLED DATA COMMUNICATION APPARATUS

BACKGROUND OF THE INVENTION

1. Field of the Invention

The present invention relates generally to data communication apparatus and, more particularly, to means for conveying data between a fixed station and a moving vehicle.

2. Description of the Prior Art

Although numerous guidance systems are used in the prior art for guiding a vehicle over some predetermined path or series of paths (see the Comer et al U.S. Pat. No. 3,507,349 and the copending U.S. Pat. application of Comer, Ser. No. 815,467, filed Apr. 11, 1969 and assigned to the assignee of the present invention), suitable means which are both simple and reliable in operation for accurately indicating position of the vehicle on the path have heretofore not been available.

Among the methods used in the prior art to convey position information to a moving vehicle are included: simple, distance traveled (odometer) measuring systems in which an odometer is used to measure the distance from a reference point; optical systems in which various combinations of light beams (in either direct or reflected form) are detected by vehicle carried light sensors; and magnetic systems in which one or more localized magnetic fields are created for use as fixed references.

Odometer systems have the obvious disadvantage that even small errors in measurement compound into rather substantial errors where the measured run length is long. Furthermore such systems require computation to determine vehicle position. Optical systems, although capable of providing precision position information, have the disadvantage that dust, dirt and other foreign matter can easily occlude or even cover completely the light reflective or light transmissive surfaces to a degree that erroneous communication is obtained. Such systems are therefore typically unreliable for use in many environments.

Magnetic systems have in the past been primarily limited to providing single reference points which are identifiable by the energizing frequency utilized. One such system is disclosed in the U.S. Pat. to Lubich No. 3,493,741 wherein a plurality of individual coils are provided at spaced apart locations along a traveled way and each of the coils are energized at a different frequency which, when detected by a vehicle, provide a positive position indication. One rather obvious disadvantage of this technique is that it is a system having a large number of positions to be identified, a correspondingly large number of signal frequency sources, as well as frequency detection and identification apparatus capable of accurately identifying each of the position indicating frequencies, will be required.

An alternative method which has been proposed is to use a plurality of variably polarized permanent magnets positioned side-by-side to provide coded position information. This method, however, is also disadvantageous in that relatively large magnets are required in order to establish detectable magnetic fields and the cost as well as installation of such magnets is expensive. Furthermore, the provision of holes in a floor, ceiling, or wall adequate to accommodate such magnets may require that certain re-enforcing materials be removed or restructured, thus weakening the structure.

SUMMARY OF THE PRESENT INVENTION

It is therefore a primary object of the present invention to provide a novel apparatus for communicating data to a moving vehicle that is both simple and relatively inexpensive, yet is highly reliable.

Another object of the present invention is to provide such apparatus which can be easily installed in existing vehicles and associated structures without requiring material structural alteration of either.

Still another object of the present invention is to provide a novel apparatus for communicating position information and the like to a vehicle constrained to follow a fixed path.

In accordance with the present invention, data communication apparatus for conveying position identifying information to a moving vehicle is disclosed which includes, at each station to be identified, a first set of transmitting coils serially arranged along the vehicle path and lying in a common plane so that adjacent ones of the coils develop electromagnetic fields which are parallel at the center of the coil, and a second set of transmitting coils positioned proximate the first set, with each coil in the second set and in the same common plane being associated with one or more of the coils in the first set so to develop a predetermined interrelationship between the magnetic fields developed by the respective coils in the first and second sets the fields created by the coils in the first set and those created by the coils in the second set are either in phase (representing a first data state) or out of phase (representing a second data state). For obtaining the data from the magnetic fields the moving vehicle carries a set of receiver coils and electronic circuitry responsive thereto which compares the phase relationship between the magnetic fields generated by the corresponding coils in each set, and develops codes uniquely identifying the particular stations as they are passed.

Among the advantages of the present invention are that a series of encoded characters in binary or other communicative codes can be easily detected; the transmitting coils can be easily installed in an existing structure and can be energized by the same source used to energize the vehicle guidance path conductors; and the intercommunication between transmitter coils and receiver coils is unaffected by dirt, dust, or other nonmetallic foreign matter which might become interposed therebetween.

These and other advantages of the present invention will no doubt become apparent to those skilled in the art after having read the following detailed disclosure of a preferred embodiment which is illustrated in the several figures of the drawing.

IN THE DRAWING

FIG. 1 schematically illustrates a vehicle guidance system utilizing the present invention.

DETAILED DESCRIPTION OF THE PREFERRED EMBODIMENT

Figure 1:
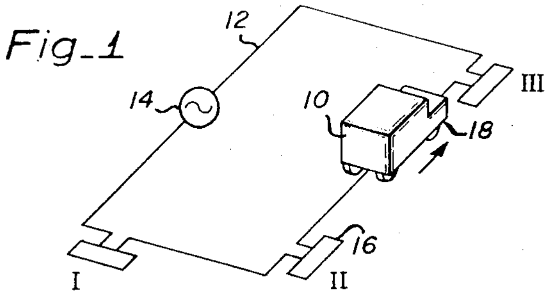

Referring now to FIG. 1 of the drawing, a self-powered vehicle 10 is shown which is guided over a pathway defined by a conductor which is detected by a guidance sensor carried by vehicle 10 and used to control the steering of the vehicle. A detailed disclosure of a vehicle guidance system for warehouse vehicles, and the like, is disclosed in the aforementioned copending Comer application. In order to determine the position of vehicle 10 along conductor 12, station indicators 16 are provided at a number of stations I, II and III which are also energized by source 14 via conductor 12. Station indicators 16, also referred to herein as transmitter coil sets, develop a pattern of magnetic fields which, when detected by a magnetic field sensor 18 carried by vehicle 10, uniquely identify each station. As described in more detail below, station indicators 16 may also transmit other data besides position information.

In addition to the magnetic field sensor 18, vehicle 10 also carries an odometer which is driven by the vehicles drive system to precisely determine the distance vehicle 10 has traveled after passing one of the stations. In the preferred embodiment, the odometer is automatically reset to zero upon passing over each station indicator 16 and thereupon begins a new measurement of the distance to the next station. From the odometer, the operator vehicle 10 can determine at any point in transit, his location relative to a particular station in terms of inches (or feet, etc.). An electrical output taken from the odometer can also be used to stop the vehicle at a particular point along its path of travel.

Figure 3:
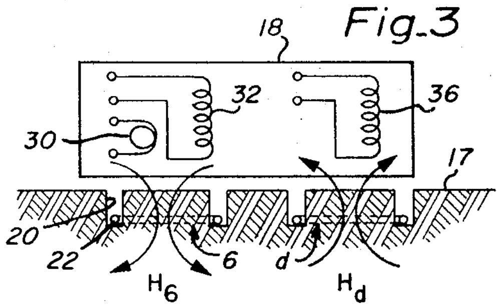
FIG. 3 is a cross section taken along the line 3—3 of FIG. 2.
Figure 2:
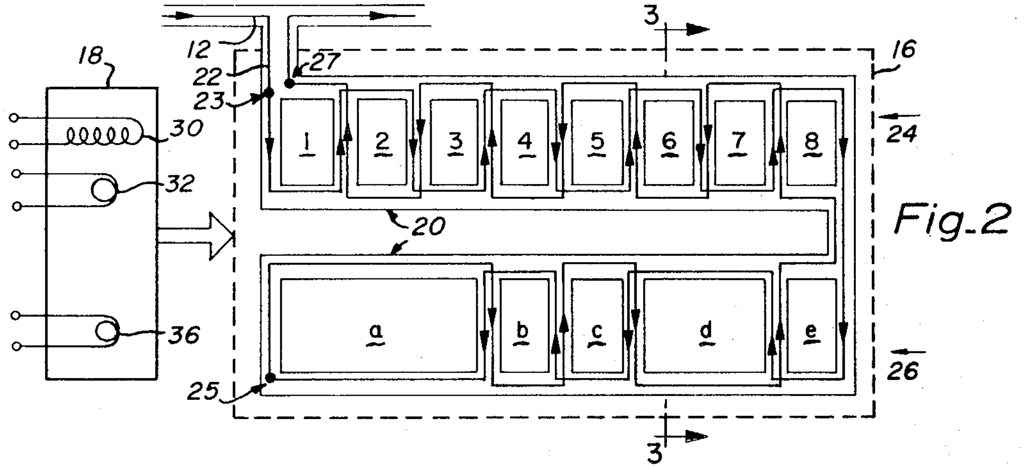
FIG. 2 is a diagram illustrating transmitter and receiver coils in accordance with a preferred embodiment of the present invention.

FIGS. 2 and 3 illustrates a preferred embodiment of the structure used to form the station indicators 16. In accordance with this embodiment, which is particularly suited for warehousing vehicle systems, a network of slots 20 are cut in the vehicle supporting surface (warehouse floor, for example) and a continuous conductor 22, which is connected in series with guidance conductor 12, is threaded into the slots so as to form two sets of adjacently disposed transmitting coils 24 and 26 arranged longitudinally with respect to guidance conductor 12. Conductor 22 is threaded, as illustrated, from point 23 through the slots forming coil set 24, thence similarly through the slots forming coil set 26 to point 25. It is then threaded back through both coil sets, as indicated, to complete the coils 1–8 of set 24 and coils *a – e* of set 26 upon reaching point 27. It will be noted that because of the manner in which conductor 22 is interwoven through the slots 20, the magnetic flux developed at any given instant of time by coils 1, 3, 5 and 7 will be of the same polarity and opposite to that developed by the coils 2, 4, 6 and 8. Similarly, the magnetic flux generated by coils *a, c* and *e* will be of the same polarity and opposite that developed by coils *b* and *d*. Note also that the direction in which coil *a* is wound is opposite to the corresponding coils 1 and 3 in set 24, but is wound in the same direction as is coil 2 in set 24. Similarly, coil *b* is wound to coil 4, coil *c* is wound opposite to coil 5, coil *d* is wound opposite to coil 6, but is in the same direction as coil 7, and coil *e* is wound in the same direction as is coil 8.

With an instaneous current flow in the direction indicated by the arrowheads the magnetic field $H_d$ developed by current flow in coil *d* will be directed out of the floor 17 while the magnetic field $H_6$ developed by current flow in coil 6 will be directed into the flow 17. Since the current flowing in guide conductor 12 is an alternating current alternating at some particular frequency, typically in the audio frequency range, it will be difficult to detect any meaninful information from the various magnetic fields which likewise change at the same frequency unless some reference is provided. In accordance with the present invention, such reference is provided by winding the coils of set 24 to develop fields of alternating polarity and then, for example, comparing the instantaneous phase of magnetic field $H_6$ against the instantaneous phase of magnetic field $H_d$. Since both sets of coils are commonly energized, the currents in both sets will always be in phase and consequently the flux developed by the associated coils in each set, i.e., 1 and *a*, 2 and *a*, 3 and *a*, 4 and *b*, etc., will either be in phase or 180° out of phase, depending upon the selected winding direction of coils *a – e*.

Accordingly, by providing sensor 18 with a first receiving coil 32 disposed for serial passage through the fields created by coil set 24, and a second receiving coil 36 disposed for serial passage through the fields created by coil set 26, two electromotive forces (EMF's) can be generated which can be compared to provide an eight digit binary code. (Note that alternatively, other magnetic field sensing devices may be substituted for the illustrated receiving coils.). However, since a rather wide coil "diameter" (sensor travel distance over each coil) is used, on the order of 2 inches in the coils of bank 24, and the "diameter" of the coils in set 26 varies from two inches to multiples thereof, it will be necessary to provide means for selecting particular physical positions at which to sample the magnetic fields generated by the associated pairs of coils. This function is accomplished by means of a third receiving coil 30 which has its sensitive axis orthogonally disposed relative to receiver coil 32.

The sensitive axis of coil 30 lies in a plane parallel to the plane including the windings of set 24, whereas receiving coil 32 has a sensitive axis which lies in a plane perpendicular to the plane including the coils of set 24. Alternatively, coil 30 could be disposed with its sensitive axis parallel to that of coil 32 if it were to be positioned relative to coil 32 such that it will pass over the transmitter coil forming conductors while coil 32 is passing over the center of the transmitter coil. Thus, as sensor 18 is passed over a particular station indicator, the windings of coil 30 will cut through maximum flux when directly over the conductors 22 and will cut through minimum flux when positioned over the center of each of the windings, while the windings of receiving coils 32 and 36 will cut through minimum flux when directly over a conductor and through maximum flux when over the center of a coil. As receiver coil 30 passes over coils 1 through 8 in order, the induced EMF developed in the windings thereof will resemble the curve 31 schematically illustrated in part B of FIG. 5. For purposes of reference, the conductor positions and directions of current flow through coil set 24 are indicated in Part A of FIG. 5 which may be considered a longitudinal section taken along the path of traverse of coils 30 (and 32). The dots represent current directed out of the plane of the drawing, and the $x$'s represent current directed into the plane of the drawing. The EMF induced in coil 32 in passing across transmitter coil set 24 is similarly illustrated by the curve 33 shown in part C of FIG. 5. Note that although similar in form to curve 31, i.e., resembling a sine wave, curve 33 is 90° out of phase with curve 31.

Figure 5:
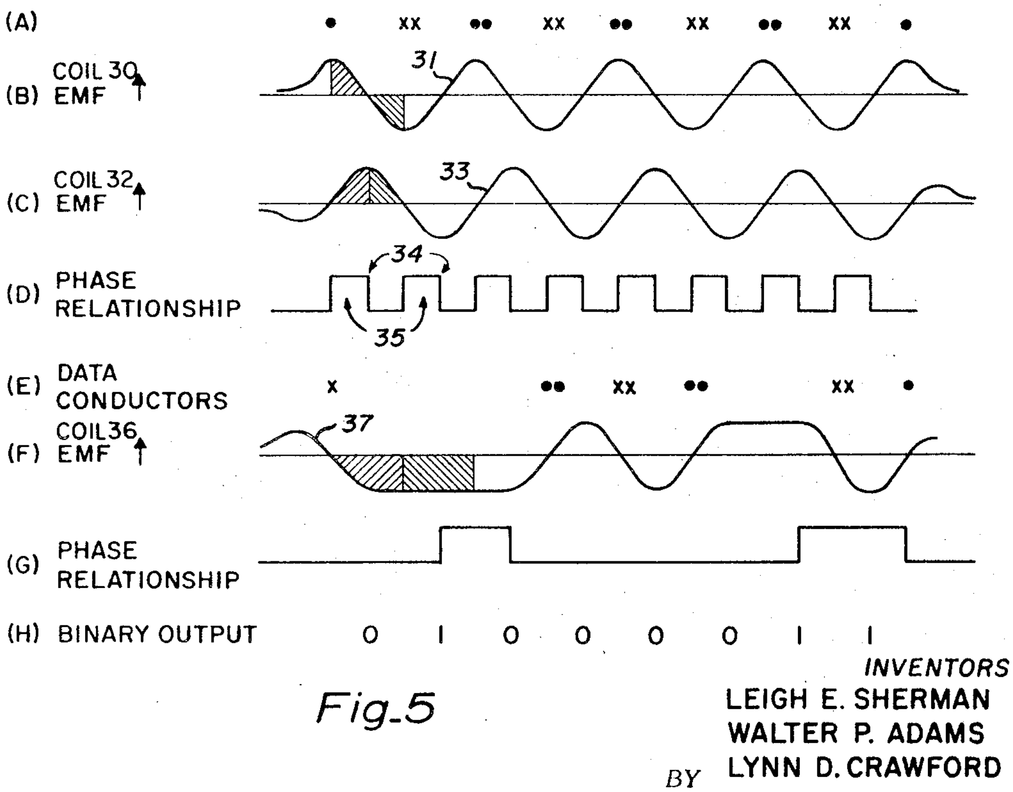
FIG. 5 is a timing diagram illustrating the operation of the present invention.

By comparing the phases of the signals developed in receiver coils 30 and 32 as they are passed across coil set 24, a comparison signal proportional to the phase relationship may be developed as illustrated in Part D of FIG. 5. Since the flux giving rise to the two signals 31 and 33 is induced by the same alternating current, the phase relationship of the two signals will be fixed, independent of their position over coils 1 through 8, and independent of the instantaneous phase of the current passing through conductors 22. Thus, the leading edges 34 of the pulses 35 will occur precisely as coils 30 and 32 pass over the centers of the windings 1 through 8, and can thus be used to initiate clocking pulses for comparison sampling of the magnetic fields developed by the transmitting coils of sets 24 and 26.

Receiving coil 36 is disposed with its sensitive axis lying in a plane perpendicular to the plane including the transmitting coils $a$ through $e$. Receiving coil 36 thus acts in a manner similar to coil 32 in that the flux detected thereby will be at a minimum when the coil is passing directly over a conductor, and will be at a maximum when positioned over the center of any of the transmitting coils. As in Part A of FIG. 5, Part E is representative of a longitudinal section taken through coil set 26 with the dots likewise indicating currents in the direction out of the plane of the drawing and the $x$'s indicating currents directed into the plane of the drawing. The curve 37 of Part F is illustrative of the instantaneous EMF which would be developed in receiving coil 36 if it were passed instantaneously across transmitter coil set 26.

Part G of FIG. 5 indicates the phase relationship between the EMFs developed in coils 32 and 36, i.e., the phase relationship between the curves 33 and 37. Thus, if curves 33 and 37 are sampled at times corresponding to the leading edges 34 of the pulses 35, then a binary output of the type illustrated in Part H of FIG. 5 can be obtained.

Figure 4:
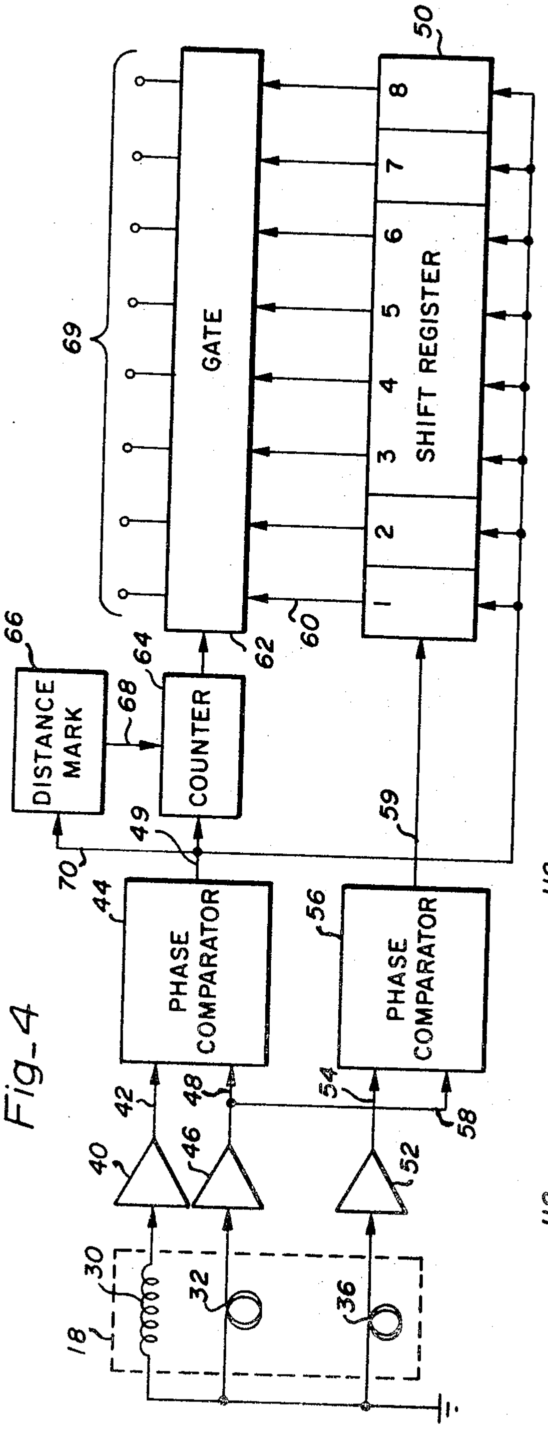
FIG. 4 is a block diagram of an electronic detection system in accordance with a preferred embodiment of the present invention.

Referring now to FIG. 4 of the drawing, detection circuitry in accordance with the present invention is illustrated in block diagram form. The output of coil 30 is amplified by an amplifier 40 and then fed into a first input terminal 42 of a first phase comparator 44. Similarly, the output of coil 32 is amplified by an amplifier 46 and then coupled into the input terminal 48 of comparator 44. Since the signals developed in coils 30 and 32 will have relationships such as illustrated by the curves in Parts B and C in FIG. 5, the output signal developed by comparator 44 at output terminal 49 will be of the form illustrated in Part D of FIG. 5 and thus can be used to clock data into the shift register 50.

The output of receiving coil 36 is amplified by an amplifier 52 and then coupled into the input terminal 54 of a second phase comparator 56. The amplified output of coil 32 is also coupled into the input terminal 58 of comparator 56. Since the signals input to comparator 56 will be of the form illustrated in Parts C and F of FIG. 5, the output on terminal 59 will be of the form shown in Part G. When this data signal is clocked to the eight stage shift register 50, binary output signals are developed on lines 60 which, by means of a gate 62 may be selectively coupled into the vehicle control or position indicating circuitry. Gate 62 is actuated by counter 64, which is responsive to clocking output of comparator 44, and upon counting eight clock pulses opens gate 62 to output the data stored in shift register 50 to output terminals 69.

As may be noted from the disclosure of the above mentioned copending Comer application, where the present invention is used in a warehousing system the vehicle will in transit pass across numerous crossing conductors which may likewise cause an erroneous pulse to be generated by the detection circuitry. This pulse will be clocked into shift register 50 just as will a signal detected in passing over one of the coils of a station indicator. And if eight such spurious signals were to be serially clocked into register 50, an erroneous position signal would be output on terminals 69. In order to avoid such erroneous signals, a mark generator 66 is utilized which generates a reset pulse on line 68 at some selected distance of vehicular travel which is larger than the diameter of a clock winding. For example, if the diameter of a clock winding is 2 inches, then mark generator 66 might be set to generate a counter reset pulse every 3 inches, so that counter 64 will be reset and thus be made to ignore any pulses which are not generated by a transmitting coil. In order to prevent mark generator 66 from resetting counter 64 when sensor 18 is passing over a station indicator, it is itself reset by the clock pulses 35 generated by comparator 44 so that no reset pulse will be developed on line 68 during the time that detector 18 is actually passing over the station indicator.

Figure 6:
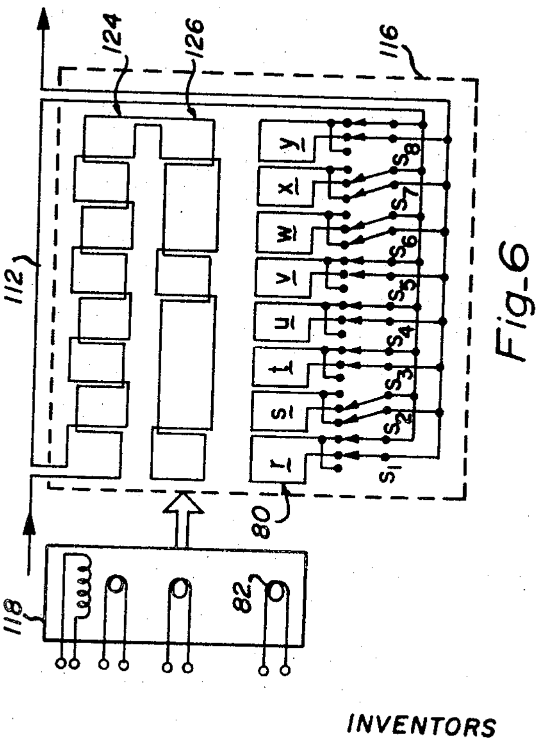
FIG. 6 is a schematic diagram illustrating an alternative embodiment of the present invention.

Although the present invention has thus far been described with relation to a station indicator including two sets of transmitting coils, one serving as a clock set and the other serving as a data set, it will be appreciated that additional sets of coils can likewise be provided for transmitting other data which may be detected by additional detecting coils and associated comparator circuitry. For example, as illustrated in FIG. 6 of the drawing, a third set of transmitting coils 80 may be provided for transmitting additional information to the modified sensor 118 which includes a fourth receiving coil 82 disposed for passage directly over coil set 80. Coil set 80 could be of a fixed informational nature as are coil sets 124 and 126, and the respective coils $r$ through $y$ could be formed by an extension of the source conductor that forms coils sets 124 and 126. However, to illustrate that the informational data can also be made changeable, coil set 80 is shown comprised of a plurality of individual windings which are selectively connected in parallel to guide wire 112 through the double pole throw switches $S_1$–$S_8$. Switches $S_1$–$S_8$ permit the current direction in the several coils to be individually selected so that a large number of data combinations can be selectively developed by coil set 80.

Additional information could also be provided at a given station by simply increasing the number of coils in each coil set. The eight coil bank is illustrated here merely as a convenient multiple for the preferred embodiment.

Figure 7:
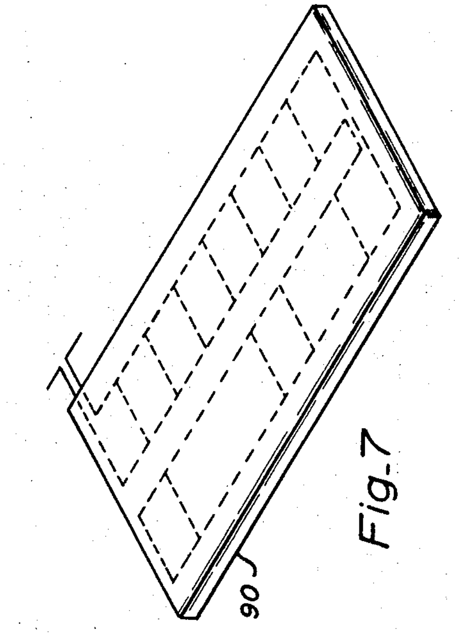
FIG. 7 illustrates a preformed transistor coil structure in accordance with an alternative embodiment of the present invention.

As an alternative to the disposition of the coil windings in slots in a floor, wall, or ceiling, the coils could likewise be disposed in a thin sheet 90 of plastic, rubber, or the like, (see FIG. 7) which could then be suitably positioned on a floor, wall or ceiling of the traveled way.

After having read the above disclosure, it is contemplated that many other alterations and modifications of the present invention will no doubt become apparent to those skilled in the art and it is therefore to be understood that the particular embodiment disclosed is for purposes of illustration only and is not to be considered limiting. Accordingly, it is intended that the appended claims be interpreted as covering all such additions and modifications as fall within the true spirit and scope of the invention.

What is claimed is:

1. Data communication apparatus, comprising:
a current source;
a first set of transmitting coils energized by said source and operative to develop a first series of magnetic fields;
a second set of transmitting coils energized by said source and operative to develop a second series of magnetic fields having a predetermined relationship to said first series of magnetic fields, said relationship being indicative of the data to be communicated;
magnetic field sensing means including, a first receiving coil disposed for passage through said first series of magnetic fields and operative to develop first signals, and a second receiving coil disposed for passage through said second series of magnetic fields and operative to develop second signals;
signal comparing means responsive to said first and second signals and operative to develop output signals, commensurate with the data to be communicated; and
gating means responsive to said first signal for allowing said output signal to pass to an output line when said first receiving coil is at preselected positions with respect to each transmitting coil of said first set.

2. Data communication apparatus as recited in claim 1 wherein said first set of transmitting coils includes a continuous conductor distributed over a first tortuous path to provide a first series of loops each forming one of the transmitting coils of said first set.

3. Data communication apparatus as recited in claim 2 wherein said first tortuous path lies within a single plane and each of said transmitting coils in said first set develops a magnetic field oppositely polarized with respect to that developed by the immediately adjacent transmitting coils in said first set.

4. Data communication apparatus as recited in claim 2 wherein said second set of transmitting coils includes an extension of said continuous conductor distributed over a second tortuous path to provide a second series of loops each forming one of the transmitting coils of said second set and each having a predetermined relationship to one or more of the coils of said first set.

5. Data communication apparatus as recited in claim 4 wherein said first and second tortuous paths lie within a single plane and each of the transmitting coils of said second set are disposed laterally adjacent portions of said plane in common with one or more of the transmitting coils of said first set.

6. Data communication apparatus as recited in claim 5 wherein the transmitting coils of said first set are disposed along a straight line lying in said plane and the transmitting coils of said second set are disposed along a second line parallel to said first line and lying in said plane, said particular portions being generally rectangular and including said first and seconds lines.

7. Data communication apparatus as recited in claim 1 and further comprising:
a third set of transmitting coils energized by said source and operative to develop a third series of magnetic fields;
switching means for coupling the coils of said third set to said source in either one configuration whereby the instantaneous current through the various coils is in one direction or in an opposite configuration whereby the instantaneous current through the various coils is in the opposite direction;
said sensing means further including a third receiver coil disposed for passage through said third series of magnetic fields and operative to develop third signals, said signal comparing means being additionally responsive to said third signals.

8. Data communication apparatus, comprising:
a source of alternating current;
a first set of closely adjacent transmitting coils energized by said source and operative to develop a first series of magnetic fields:
a second set of transmitting coils coextensive with said first set of coils energized by said source and operative to develop a seconds series of magnetic fields having a predetermined relationship to said first series indicative of the data to be communicated;
first and second magnetic field detectors disposed for movement through said first and second set of coils, respectively; and
means for comparing the signals developed in said first and second detectors and for providing an output signal only when said first detector is at a preselected position with respect to each coil of said first set.

9. Data communication apparatus as recited in claim 8 wherein said first set of transmitting coils includes a first segment of a continuous conductor distributed over a first tortuous path to provide a first series of loops each forming one of the transmitting coils of said first set.

10. Data communication apparatus as recited in claim 9 wherein said first tortuous path lies within a single plane and each of the transmitting coils in said first set develops a magnetic field oppositely polarized with respect to that developed by the immediately adjacent transmitting coils in said first set.

11. Data communication apparatus as recited in claim 9 wherein said second set of transmitting coils includes a second segment of said continuous conductor distributed over a second tortuous path to provide a second series of loops each forming one of the transmitting coils of said second set.

12. Data communication apparatus as recited in claim 11 wherein said first and second tortuous paths lie within a single plane and each of the transmitting coils of said second set are disposed laterally adjacent particular portions of said plane, said portions including one of the transmitting coils of said second set and one or more of the transmitting coils of said first set.

13. Data communication apparatus comprising:

magnetic field sensing means including, a first receiver coil having a first sensitive axis, a second receiver coil having a second sensitive axis disposed at an angle relative to said first sensitive axis, said first and second receiver coils being responsive to a first magnetic field and operative to develop first and second signals respectively, and a third receiver coil responsive to a second magnetic field and operative to develop third signals;

a first phase comparator responsive to said first and second signals and operative to develop clock signals;

a second phase comparator responsive to said first and third signals and operative to develop data signals; and a shift register responsive to said clock signals and said data signals and operative to develop output signals.

14. Data communication apparatus, comprising:

a current source;

a first set of transmitting coils energized by said source and operative to develop a first series of magnetic fields;

a second set of transmitting coils energized by said source and operative to develop a second series of magnetic fields having a predetermined relationship to said first series of magnetic fields, said relationship being indicative of the data to be communicated;

magnetic field sensing means including, a first receiving coil disposed for passage through said first series of magnetic fields and operative to develop first signals, a second receiving coil disposed for passage through said second series of magnetic fields and operative to develop second signals, and a third receiving coil disposed for passage through said first series of magnetic fields and operative to develop third signals, said third receiving coil having a sensitivity axis angularly disposed relative to the sensitivity axis of said first receiving coil; and signal comparing means responsive to said first and second signals and operative to develop output signals commensurate with said data to be communicated, said signal comparing means also including gating means responsive to said third signals for gating said output signals to an output line.

15. Data communication apparatus as recited in claim 14 wherein said signal comparing means includes, a first phase comparator responsive to said first and third signals and operative to develop clock signals, a second phase comparator responsive to said first and second signals and operative to develop data signals, and a shift register responsive to said clock signals and said data signals and operative to provide said output signals.

* * * * *